(12) United States Patent
Leone et al.

(10) Patent No.: US 6,385,958 B2
(45) Date of Patent: May 14, 2002

(54) METHOD FOR PRESSURE MODULATION OF TURBINE SIDEWALL CAVITIES

(75) Inventors: Sal Albert Leone, Scotia; Matthew David Book, Altamont; Christopher R. Banares, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/840,879

(22) Filed: Apr. 25, 2001

Related U.S. Application Data

(62) Division of application No. 09/491,599, filed on Jan. 25, 2000.

(51) Int. Cl.$^7$ ................................................. F02C 7/12
(52) U.S. Cl. ......................................................... 60/39.02
(58) Field of Search ............................ 60/39.02, 39.07, 60/39.29, 39.75

(56) References Cited

U.S. PATENT DOCUMENTS

| | | |
|---|---|---|
| 4,296,599 A | 10/1981 | Adamson ................... 60/39.75 |
| 4,332,133 A | 6/1982 | Schwarz |
| 4,416,111 A | 11/1983 | Lenahan |
| 4,462,204 A | 7/1984 | Hull |
| 4,807,433 A | 2/1989 | Maclin |
| 5,611,197 A | 3/1997 | Bunker |
| 5,641,267 A | 6/1997 | Proctor |
| 5,857,321 A | 1/1999 | Rajamani |
| 6,065,282 A * | 5/2000 | Fukue et al. ................ 60/39.75 |

OTHER PUBLICATIONS

"39$^{th}$ GE Turbine State–of–the–Art Technology Seminar", Tab 1, "F" Technology—the First Half–Million Operating Hours, H.E. Miller, Aug. 1996.

"39$^{th}$ GE Turbine State–of–the–Art Technology Seminar", Tab 2, "GE Heavy–Duty Gas Turbine Performance Characteristics", F. J. Brooks, Aug. 1996.

"39$^{th}$ GE Turbine State–of–the–Art Technology Seminar", Tab 3, "9EC 50Hz 170–MW Class Gas Turbine", A. S. Arrao, Aug.1996.

"39$^{th}$ GE Turbine State–of–the–Art Technology Seminar", Tab 4, "MWS6001FA—An Advanced–Technology 70–MW Class 50/60 Hz Gas Turbine", Ramachandran et al., Aug. 1996.

"39$^{th}$ GE Turbine State–of–the–Art Technology Seminar", Tab 5, "Turbomachinery Technology Advances at Nuovo Pignone", Benvenuti at al., Aug. 1996.

"39$^{th}$ GE Turbine State–of–the–Art Technology Seminar", Tab 6, "GE Aeroderivative Gas Turbines—Design and Operating Features", M.W. Horner, Aug. 1996.

(List continued on next page.)

Primary Examiner—Louis J. Casaregola
(74) Attorney, Agent, or Firm—Nixon & Vanderhye PC

(57) ABSTRACT

A method is provided for controlling cooling air flow for pressure modulation of turbine components, such as the turbine outer sidewall cavities. The pressure at which cooling and purge air is supplied to the turbine outer side wall cavities is modulated, based on compressor discharge pressure (Pcd), thereby to generally maintain the back flow margin (BFM) so as to minimize excessive leakage and the consequent performance deterioration. In an exemplary embodiment, the air pressure within the third stage outer side wall cavity and the air pressure within the fourth stage outer side wall cavity are each controlled to a respective value that is a respective prescribed percentage of the concurrent compressor discharge pressure. The prescribed percentage may be determined from a ratio of the respective outer side wall pressure to compressor discharge pressure at Cold Day Turn Down (CDTD) required to provide a prescribed back flow margin.

8 Claims, 3 Drawing Sheets

OTHER PUBLICATIONS

"39th GE Turbine State–of–the–Art Technology Seminar", Tab 7, "Advance Gas Turbine Materials and Coatings", P.W. Schilke, Aug. 1996.

"39th GE Turbine State–of–the–Art Technology Seminar", Tab 8, "Dry Low $NO_x$ Combustion Systems for GE Heavy–Duty Turbines", L.B. Davis, Aug. 1996.

"39th GE Turbine State–of–the–Art Technology Seminar", Tab 9, "GE Gas Turbine Combustion Flexibility", M.A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines," J. R. Johnston, Aug. 1996.

"39th GE Turbine State–of–the–Art Technology Seminar", Tab 16, "Gas Turbine Repair Technology", Crimi et al., Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug.1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"36th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J.H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program—Conceptual Design and Product Development", Annual Report, Sep. 1, 1994–Aug. 31, 1995.

"Advanced Turbine Systems (ATS Program) Conceptual Design and Product Development", Final Technical Progress Report, vol. 2–Industrial Machine, Mar. 31, 1997, Morgantown, WV.

"Advanced Turbine Systems (ATS Program) Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17,1998, Report No. DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar. 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" June 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century —"H" Gas Turbine Combined Cycles", Thomas C. Paul et al., Report,.

"Power–Gen '96 Europe", Conference Programme, Budapest, Hungary, Jun. 26–28, 1996.

"Power–Gen International", 1998 show Guide, Dec. 9–11, 1998, Orange County Convention Center, Orlando, Florida.

"Press Coverage following 1995 product announcement", various newspaper clippings relating to improved generator.

"Proceedings of the Advanced Turbine Systems Annual Program Review Meeting", vol. I, "Industrial Advanced Turbine Systems Program Overview", D.W. Esbeck, p.3–13, Oct., 1995.

"Proceedings of the Advanced Turbine Systems Annual Program Review Meeting", vol. I, "H Gas Turbine Combined Cycle", J. Corman, p. 14–21, Oct., 1995.

"Proceedings of the Advanced Turbine Systems Annual Program Review Meeting", vol. I "Overview of Westinghouse's Advanced Turbine Systems Program", Bannister et al., 9. 22–30, Oct., 1995.

"Proceedings of the Advanced Turbine Systems Annual Program Review Meeting", vol. I, "Allison Engine ATS Program Technical Review", D. Mukavetz, p. 31–42, Oct., 1995.

"Proceedings of the Advanced Turbine Systems Annual Program Review Meeting",vol. I, "Advanced Turbine Systems Program Industrial System Concept Development", S. Gates, p. 43–63, Oct., 1995.

"Proceedings of the Advanced Turbine Systems Annual Program Review Meeting", vol. I, "Advanced Turbine System Program Phase 2 Cycle Selection", Latcovich, Jr., p. 64–69, Oct., 1995.

"Proceedings of the Advanced Turbine Systems Annual Program Review Meeting", vol. I, "General Electric ATS Program Technical Review Phase 2 Activities", Chance et al., p. 70–74, Oct. 1995.

"Proceedings of the Advanced Turbine Systems Annual Program Review Meeting", vol. I, "Technical Review Of Westinghouse's Advanced Turbine Systems Program", Diakunchak et al., p. 75–86, Oct., 1995.

"Proceedings of the Advanced Turbine Systems Annual Program Review Meeting", vol. I "Advanced Combustion Turbines and Cycles: An EPRI Perspective", Touchton et al., p. 87–88, Oct., 1995.

"Proceedings of the Advanced Turbine Systems Annual Program Review Meeting", vol. I, "Advanced Turbine Systems Annual Program Review", William E. Koop, p. 89–92, Oct., 1995.

"Proceedings of the Advanced Turbine Systems Annual Program Review Meeting", vol. I, "The AGTSR Consortium: An Update", Fant et al., p. 93–102, Oct., 1995.

"Proceedings of the Advanced Turbine Systems Annual Program Review Meeting", vol. I, "Overview of Allison/AGTSR Interactions", Sy A. Ali, p. 103–106, Oct., 1995.

"Proceedings of the Advanced Turbine Systems Annual Program Review Meeting", vol. I, "Design Factors for Stable Lean Premix Combustion", Richards et al., p. 107–113, Oct, 1995.

"Proceedings of the Advanced Turbine Systems Annual Program Review Meeting", vol. I, "Ceramic Stationary as Turbine", M. van Roode, p. 114–147, Oct., 1995.

"Proceedings of the Advanced Turbine Systems Annual Program Review Meeting", vol. I, "DOE/Allison Ceramic Vane Effort", Wenglarz et al., p. 148–151, Oct., 1995.

"Proceedings of the Advanced Turbine Systems Annual Program Review Meeting",vol. I, "Materials/Manufacturing Element of the Advanced Turbine Systems Program", Karnitz et al., p. 152–160, Oct., 1995.

"Proceedings of the Advanced Turbine Systems Annual Program Review Meeting", vol. I, "Pratt & Whitney Thermal Barrier Coatings", Bornstein et al., p. 182–193, Oct., 1995.

"Proceedings of the Advanced Turbine Systems Annual Program Review Meeting", vol. I, "Turbine Airfoil Manufacturing Technology", Kortovich, p. 171–181, Oct., 1995.

"Proceedings of the Advanced Turbine Systems Annual Program Review Meeting", vol. I, "Westinhouse Thermal Barrier Coatings", Goedjen et al., p. 194–199, Oct., 1995.

"Proceedings of the Advanced Turbine Systems Annual Program Review Meeting", vol. I, "High Performance Steam Development", Duffy et al., p. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., p. 221–232, Oct., 1995.

"Proceedings of the Advanced Turbine Systems Annual Program Review Meeting", vol. II, "Rayleigh/Raman/LIF Measurements in a Turbulent Lean Premixed Combustor", Nandula et al., p. 233–248, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., p. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., p. 281–309, Oct., 1995.

"Proceedings of the Advanced Turbine Systems Annual Program Review Meeting", vol. II, "Life Prediction of Advanced Materials for Gas Turbine Application", Zamrik et al., p. 310–327, Oct., 1995.

"Proceedings of the Advanced Turbine Systems Annual Program Review Meeting", vol. II, "Advanced Combustion Technologies for Gas Turbine Power Plants", Vandsburger et al., p. 328–352, Oct., 1995.

"Proceedings of the Advanced Turbine Systems Annual Program Review Meeting", vol. II, "Combustion Modeling in Advanced Gas Turbine Systems", Smoot et al., p. 353–370, Oct., 1995.

"Proceedings of the Advanced Turbine Systems Annual Program Review Meeting", vol. II, "Heat Transfer in a Two-Pass Internally Ribbed Turbine Blade Coolant Channel with Cylindrical Vortex Generators", Hibbs et al., p. 371–390, Oct., 1995.

"Proceedings of the Advanced Turbine Systems Annual Program Review Meeting", vol. II, "Rotational Effects on Turbine Blade Cooling", Govatzidakia et al., p. 391–392, Oct., 1995.

"Proceedings of the Advanced Turbine Systems Annual Program Review Meeting", vol. II, "Manifold Methods for Methane Combustion", Yang et al., p. 393–409, Oct, 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., p. 410–414, Oct., 1995.

"Proceedings of the Advanced Turbine Systems Annual Program Review Meeting", vol. II, "The Role of Reactant Unmixedness, Strain Rate, and Length Scale on Premixed Combustor Performance", Samuelsen et al., p. 415–422, Oct., 1995.

"Proceedings of the Advanced Turbine Systems Annual Program Review Meeting", vol. II, "Experimental and Computational Studies of Film Cooling With Compound Angle Injection", Goldstein et al., p. 423–451, Oct., 1995.

"Proceedings of the Advanced Turbine Systems Annual Program Review Meeting", vol. II, "Compatibility of Gas Turbine Materials with Steam Cooling", Desai et al., p. 452–464, Oct, 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, p. 465–473, Oct., 1995.

"Proceedings of the Advanced Turbine Systems Annual Program Review Meeting", vol. II, "Effects of Geometry on Slot–Jet Film Cooling Performance", Hyams et al., p. 474–496 Oct., 1995.

"Proceedings of the Advanced Turbine Systems Annual Program Review Meeting", vol. II, "Steam as Turbine Blade Coolant: Experimental Data Generation", Wilmsen et al., p. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., p. 506–515, Oct., 1995.

"Proceedings of the Advanced Turbine Systems Annual Program Review Meeting", vol. II, "Intercooler Flow Path for Gas Turbines: CFD Design and Experiments", Agrawal et al., p. 529–538, Oct., 1995.

"Proceedings of the Advanced Turbine Systems Annual Program Review Meeting", vol. II, "Bond Strength and Stress Measurements in Thermal Barrier Coatings", Gell et al., p. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., p. 550–551, Oct., 1995.

"Proceedings of the Advanced Turbine Systems Annual Program Review Meeting", vol. II, "Combustion Instability Modeling and Analysis", Santoro et al., p. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., p. 560–565, Oct., 1995.

"Proceedings of the Advanced Turbine Systems Annual Program Review Meeting", vol. II, "Heat Pipe Turbine Vane Cooling", Langston et al., p. 566–572, Oct., 1995.

"Proceedings of the Advanced Turbine Systems Annual Program Review Meeting", vol. II, "Improved Modeling Techniques for Turbomachinery Flow Fields", Lakshminarayana et al., p. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", vol. II, "ATS and the Industries of the Future", Denise Swink, p. 1, Nov., 1996.

"Proceedings of the Advanced Turbine Systems Annual Program Review Meeting", vol. II, "Gas Turbine Association Agenda", William H. Day, p. 3–16, Nov., 1996.

"Proceedings of the Advanced Turbine Systems Annual Program Review Meeting", vol. II, "Power Needs in the Chemical Industry", Keith Davidson, p. 17–26, Nov., 1996.

"Proceedings of the Advanced Turbine Systems Annual Program Review Meeting", "Advanced Turbine Systems Program Overview", David Esbeck, p. 27–34, Nov., 1996.

"Proceedings of the Advanced Turbine Systems Annual Program Review Meeting", "Westinghouse's Advanced Turbine Systems Program", Gerard McQuiggan, p. 35–48, Nov., 1996.

"Proceedings of the Advanced Turbine Systems Annual Program Review Meeting", "Overview of GE's H Gas Turbine Combined Cycle", Cook et al., p. 49–72, Nov., 1996.

"Proceedings of the Advanced Turbine Systems Annual Program Review Meeting", "Allison Advanced Simple Cycle Gas Turbine System", William D. Weisbrod, p. 73–94, Nov., 1996.

"Proceedings of the Advanced Turbine Systems Annual Program Review Meeting", "The AGTSR Industry–University Consortium", Lawrence P. Golan, p. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, p. 111–122, Nov., 1996.

"Proceedings of the Advanced Turbine Systems Annual Program Review Meeting", "Methodologies for Active Mixing and Combustion Control", Uri Vandsburger, p.123–156, Nov., 1996.

"Proceedings of the Advanced Turbine Systems Annual Program Review Meeting", "Combustion Modeling in Advanced Gas Turbine Systems", Paul O. Hedman, p. 157–180, Nov., 19967.

"Proceedings of the Advanced Turbine Systems Annual Program Review Meeting", "Manifold Methods for Methane Combustion", Stephen B. Pope, p. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, p. 189–210, Nov., 1996.

"Proceedings of the Advanced Turbine Systems Annual Program Review Meeting", "Effect of Swirl and Momentum Distribution Temperature Distribution in Premixed Flames", Ashwani K. Gupta, p. 211–232, Nov., 1996.

"Proceedings of the Advanced Turbine Systems Annual Program Review Meeting", "Combustion Instability Studies Application to Land–Based Gas Turbine Combustors", Robert J. Santoro, p. 233–252.

"Proceedings of the Advanced Turbine Systems Annual Program Review Meeting", "Active Control of Combustion Instabilities in Low $NO_x$ Turbines", Ben T. Zinn, p. 253–264, Nov., 1996.

"Proceedings of the Advanced Turbine Systems Annual Program Review Meeting", "Life Prediction of Advanced Materials for Gas Turbine Application", Sam Y. Zamrik, p. 264–274, Nov., 1996.

"Proceedings of the Advanced Turbine Systems Annual Program Review Meeting", "Combustion Chemical Vapor Deposited Coatings for Thermal Barrier Coatings Systems", W. Brent Carter, p. 275–290, Nov., 1996.

"Proceedings of the Advanced Turbine Systems Annual Program Review Meeting", "Compatibility of Gas Turbine Materials with Steam Cooling", Vimal Desai, p. 291–314, Nov., 1996.

"Proceedings of the Advanced Turbine Systems Annual Program Review Meeting", "Bond Strength and Stress Measurements in Thermal Barrier Coatings", Maurice Gell, p. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, p. 335–356, Nov., 1996.

"Proceedings of the Advanced Turbine Systems Annual Program Review Meeting", "Flow Characteristics of an Intercooler System for Power Generating Gas Turbines", Ajay K. Agrawal, p. 357–370, Nov., 1996.

"Proceedings of the Advanced Turbine Systems Annual Program Review Meeting", "Improved Modeling Techniques for Turbomachinery Flow Fields", B. Lakshiminarayana, p. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393–406, Nov., 1996.

"Proceedings of the Advanced Turbine Systems Annual Program Review Meeting", "Advanced Turbine Cooling, Heat Transfer, and Aerodynamic Studies", Je–Chin Han, p. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, p. 427–446.

"Proceedings of the Advanced Turbine Systems Annual Program Review Meeting", "Experimental and Computational Studies of Film Cooling with Compound Angle Injection", R. Goldstein, p. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, p. 461–470, Nov. 1996.

"Proceedings of the Advanced Turbine Systems Annual Program Review Meeting", "Steam as a Turbine Blade Coolant: External Side Heat Transfer", Abraham Engeda, p. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483–498, Nov., 1996.

"Proceedings of the Advanced Turbine Systems Annual Program Review Meeting", "Closed–Loop Mist/Steam Cooling for Advanced Turbine Systems", Ting Wang, p. 499–512, Nov., 1996.

"Proceedings of the Advanced Turbine Systems Annual Program Review Meeting", "Heat Pipe Turbine Vane Cooling", Langston et al., p. 513–534, Nov., 1996.

"Proceedings of the Advanced Turbine Systems Annual Program Review Meeting", "EPRI's Combustion Turbine Program: Status and Future Directions", Arthur Cohn, p. 535,–552 Nov., 1996.

"Proceedings of the Advanced Turbine Systems Annual Program Review Meeting", "ATS Materials Support", Michael Karnitz, p. 553–576, Nov., 1996.

"Proceedings of the Advanced Turbine Systems Annual Program Review Meeting", "Land Based Turbine Casting Initiative", Boyd A. Mueller, p. 577–592, Nov., 1996.

"Proceedings of the Advanced Turbine Systems Annual Program Review Meeting", "Turbine Airfoil Manufacturing Technology", Charles S. Kortovich, p. 593–622, Nov., 1996.

"Proceedings of the Advanced Turbine Systems Annual Program Review Meeting", "Hot Corrosion Testing of TBS's", Norman Bornstein, p. 623–631, Nov., 1996.

"Proceedings of the Advanced Turbine Systems Annual Program Review Meeting", "Ceramic Stationary Gas Turbine", Mark van Roode, p. 633–658, Nov., 1996.

"Proceedings of the Advanced Turbine Systems Annual Program Review Meeting", "Western European Status of Ceramics for Gas Turbines", Tibor Bornemisza, p. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Testing Program Results Validate GE's H Gas Turbine — High Efficiency, Low Cost of Electricity and Low Emissions", Roger Schonewald and Patrick Marolda, (no date available).

"Testing Program Results Validate GE's H Gas Turbine — High Efficiency, Low Cost of Electricity and Low Emissions", Slide Presentation —working draft, (no date available).

"The Next Step In H ... For Low Cost Per kW–Hour Power Generation", LP–1 PGE '98.

"Utility Advanced Turbine System (ATS) Technology Readiness Testing and Pre–Commercialization Demonstration", Document #486040, Oct.1–Dec. 31, 1996, Publication Date, Jun. 1, 1997, Report No.: DOE/MC/31176—5628,.

"Utility Advanced Turbine System (ATS) Technology Readiness Testing —Phase 3", Document #666274, Oct. 1, 1996–Sep. 30, 1997, Publication Date, Dec. 31, 1997, Report No.: DOE/MC/31176—10.

"Utility Advanced Turbine System (ATS) Technology Readiness Testing and Pre–Commercial Demonstration, Phase 3", Document #486029, Oct 1–Dec. 31, 1995, Publication Date, May 1, 1997, Report No.: DOE/MC/31176—5340.

"Utility Advanced Turbine System (ATS) Technology Readiness Testing and Pre–Commercial Demonstration — Phase 3", Document #486132, Apr.1 –Jun. 30, 1976, Publication Date, Dec. 31, 1996, Report No. DOE/MC/31176—5660.

"Utility Advanced Turbine System (ATS) Technology Readiness Testing and Pre–Commercial Demonstration — Phase 3", Document #587906, Jul.1–Sep. 30, 1995, Publication Date, Dec. 31, 1995, Report No. DOE/MC/31176—5339.

"Utility Advanced Turbine System (ATS) Technology Readiness Testing and Pre–Commercial Demonstration" Document #666277, Apr.1–Jun. 30, 1997, Publication Date, Dec. 31, 1997, Report No. DOE/MC/31176—8.

"Utility Advanced Turbine System (ATS) Technology Readiness Testing: Phase 3R", Document #756552, Apr. 1–Jun.30, 1999, Publication Date, Sep. 1 1999, Report No. : DE—FC21–95MC31176–23.

"Utility Advanced Turbine System (ATS) Technology Readiness Testing.", Document #656823, Jan. 1–Mar. 31, 1998, Publication Date, Aug. 1, 1998, Report No. DOE/MC/31179–17.

"Utility Advanced Turbine Systems (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sept. 30, 1998.

"Utility Advanced Turbine Systems (ATS) Technology Readiness Testing", Document #750405, Oct. 1–Dec. 30, 1998, Publication Date: May, 1, 1999, Report No. : DE–FC21–95MC31176–20.

"Utility Advanced Turbine Systems (ATS) Technology Readiness Testing", Document #1348, Apr. 1–Jun. 29, 1998, Publication Date Oct. 29, 1998, Report No. DE–FC21–95MC31176—18.

"Utility Advanced Turbine Systems (ATS) Technology Readiness Testing—Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report No. DOE/MC/31176–07.

"Proceedings of the 1997 Advanced Turbine Systems", Annual Program Review Meeting, Oct. 28–29, 1997.

"Proceedings of the Advanced Turbine Systems Annual Program Review Meeting", vol. I, "Land–Based Turbine Casting Initiative", Mueller et al., p. 161–170, Oct., 1995.

"Proceedings of the Advanced Turbine Systems Annual Program Review Meeting", vol. II, "Premixed Burner Experiments: Geometry, Mixing, and Flame Structure Issues", Gupta et al., p. 516–528, Oct. 1995.

"Status Report: The U.S. Department of Energy's Advanced Turbine systems Program", facsimile dated Nov. 7, 1996.

"Proceedings of the Advanced Turbine Systems Annual Program Review Meeting", vol. I, "Land–Based Turbine Casting Initiative", Muellar et al., p. 161–170, Oct., 1995.

"Proceedings of the Advanced Turbine Systems Annual Program Review Meeting", vol II, "Lean Premixed Flames for Low $No_x$Combustors", Sojka et al., p. 249–275, Oct., 1995.

"Proceedings of the Advanced Turbine Systems Annual Program Review Meeting", vol. II, "Premixed Burner Experiments: Geometry, Mixing, and Flame Structure Issues", Gupta et al., p. 516–528, Oct., 1995.

"Status Report: The U.S. Department of Energy's Advanced Turbine systems Program", facsimile dated Nov. 7, 1996.

* cited by examiner

METHOD FOR PRESSURE MODULATION OF TURBINE SIDEWALL CAVITIES

CROSS-REFERENCE TO RELATED APPLICATIONS

This is a division of application Ser. No. 09/491,599, filed Jan. 25, 2000, now pending, the entire content of which is hereby incorporated by reference in this application.

STATEMENT REGARDING FEDERALLY SPONSORED RESEARCH AND DEVELOPMENT

The U.S. Government may have certain rights in this invention pursuant to Contract No. DE-FC21-95MC31176 awarded by the U.S. Department of Energy.

BACKGROUND OF THE INVENTION

The invention relates to cooling and purge air-flow systems for gas turbines.

A gas turbine engine conventionally includes a compressor for compressing ambient air for being mixed with fuel and ignited to generate combustion gases in a combustor. A turbine receives the hot combustion gases and extracts energy therefrom for powering the combustor and producing output power, for example for powering an electrical generator. The turbine conventionally includes one or more stages of stator nozzles or vanes, rotor blades and annular shrouds around the turbine blades for maintaining appropriate clearances therewith. As turbine inlet temperatures have increased to improve the efficiency of gas turbine engines, it has become necessary to provide a cooling fluid such as air to the turbine vanes, blades and shrouds to maintain the temperatures of those components at levels that can be withstood by the materials thereof, to ensure a satisfactory useful life of the components. Cooling is typically accomplished by extracting a portion of the air compressed by the compressor from the compressor and conducting it to the components of the turbine to cool the same. Any air compressed in the compressor and not used in generating combustion gases necessarily reduces the efficiency of the engine. Therefore, it is desirable to minimize the amount of cooling air bled from the compressor. Furthermore, the air used for cooling turbine components typically discharges from orifices or gaps in those components. That cooling air mixes with the combustion gases in the turbine and will also reduce engine efficiency for thermodynamic and aerodynamic reasons. Accordingly, while turbine efficiency increases as turbine inlet temperature increases, that increase in temperature also requires effective cooling of the heated components, and such cooling is optimally effected in a manner so as not to forfeit the increased efficiency realized by the increased temperature.

The axial location or stage where the air is bled from the compressor is determined by the pressure required by the component or system to be serviced by that air. To ensure sufficiently high delivery pressure, in general it is desirable to select the source with the highest possible pressure. However, bleeding air from the earliest possible stage of the compressor will increase compressor efficiency by reducing the amount of work invested in the extracted air. Therefore, it is desirable to achieve the highest possible system supply pressure from the earliest and lowest pressure stage of the compressor.

Furthermore, the cooling air must be provided at suitable pressures and flow rates to not only adequately cool the turbine component(s) but to maintain acceptable back flow margin(s). Back flow margin is defined as the difference between the cooling air pressure inside, for example, the outer side wall, and the pressure of the hot combustion gases which flow through the turbine. A positive back flow margin is desirably maintained so that combustion gases are not ingested into the outer sidewall.

BRIEF SUMMARY OF THE INVENTION

The pressure in the outer side wall cavities of the third and fourth stage nozzles is critical for setting back flow margin (BFM). As noted above, the purpose of BFM is to stop ingestion of hot flow-path gas into the outer side wall cavities. BFM is the percentage that the cavity pressure is above the maximum pressure in the associated gas path. Usually, for a nozzle stage, the maximum pressure will be the maximum stagnation pressure on the airfoil lead edge. Conventionally, the minimum back flow margin (e.g. 3%) is set according to the worst conditions to which the component is to be exposed. In the case of some gas turbine systems, worst conditions occur at Cold Day Turn Down (CDTD), typically about 0-degrees and half power. Under these conditions, maximal compressor bleed flow is appropriate because the compressor bleed pressure is low compared to the compressor outlet pressure. When the BFM is set at CDTD, however, the actual back flow margin will increase away from that at CDTD because under other conditions, the bleed pressure from the compressor is higher than at CDTD. If the BFM is too large, the outer side cavities will leak excessively and as a result combined cycle performance will deteriorate. In that regard, as noted above, a negative consequence of this excessive leakage is a performance loss because the work/power used to compress that air is wasted.

To balance these two opposing requirements, the invention is embodied in a cooling and purge air supply system wherein the pressures in the outer side wall cavities are modulated, based on compressor discharge pressure (Pcd) in the presently preferred embodiment, thereby to generally maintain the BFM so as to minimize excessive leakage and the consequent performance deterioration.

Thus, the invention may be embodied in a cooling air flow control system for a gas turbine. In such an embodiment, the cooling air flow control system comprises a valve that controls the pressure of cooling air conducted from the compressor to the turbine and a controller for controlling the valve in accordance with an operating condition of the gas turbine, for example, the compressor discharge pressure. In an exemplary embodiment, during at least a portion of the operating range of the gas turbine, the control system controls the valve to substantially maintain the air pressure within a component of the turbine at a value that is a prescribed percentage of the concurrent compressor discharge pressure.

The invention may also be embodied in a system and method for providing cooling and/or purge air from a multi-stage compressor to an associated turbine for cooling at least one component of the turbine and/or preventing back flow of combustion gases thereinto wherein the pressure of the cooling and/or purge air is controlled according to an operating condition of the turbine, for example, the compressor discharge pressure. In an exemplary embodiment, the pressure of the cooling and/or purge air is controlled to substantially maintain the air pressure within the component of the turbine at a value that is a prescribed percentage of the concurrent compressor discharge pressure.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
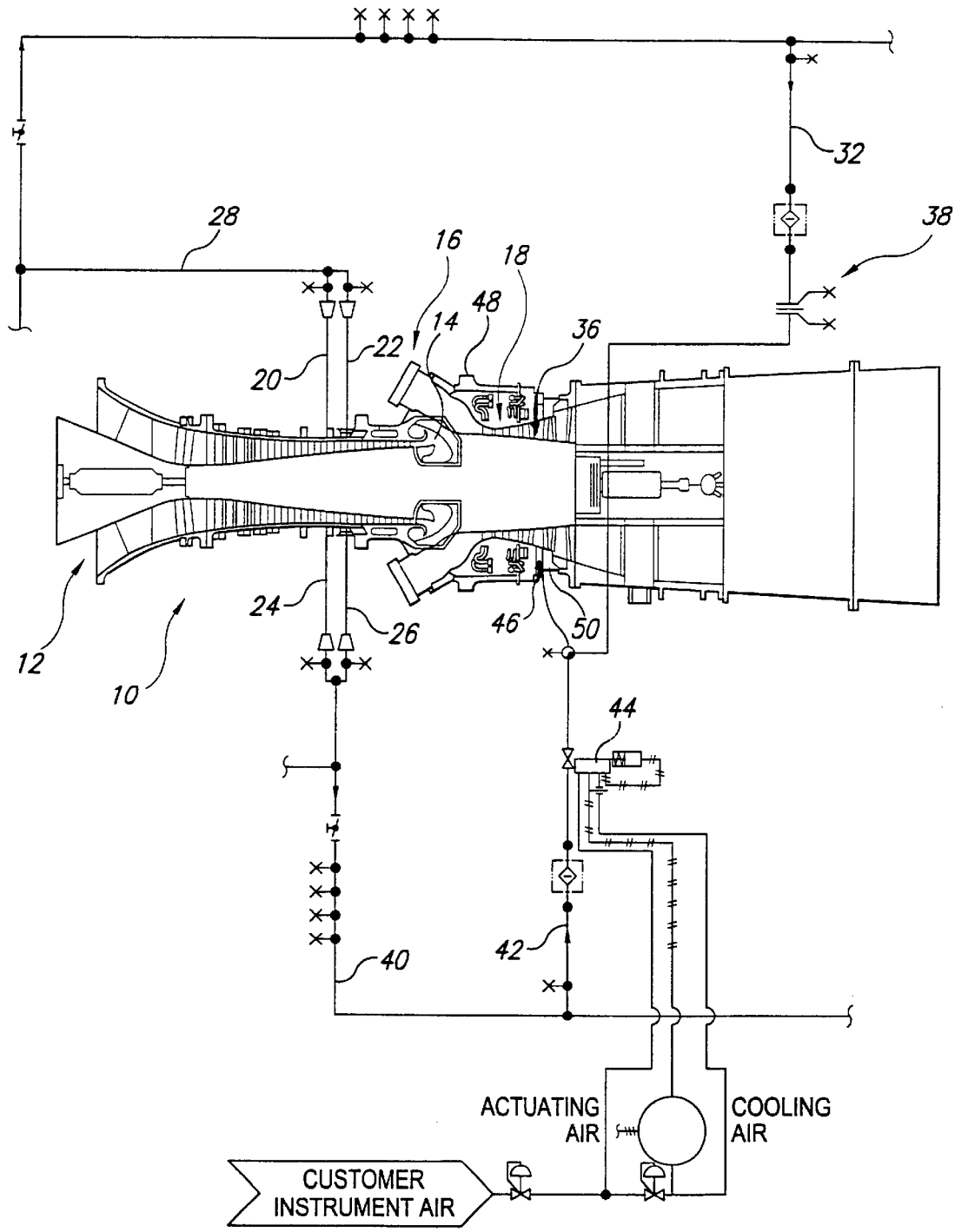
FIG. 1 is a schematic cross-sectional view of a gas turbine having pressure modulation for the third and fourth stage outer side wall cavities in an embodiment of the invention.

Illustrated schematically in FIG. 1 is an exemplary gas turbine used for powering, for example, an electric generator (not shown). The gas turbine includes compressor 10 having an annular inlet 12 for receiving and compressing air, which is discharged from an annular outlet 14 of the compressor 10 at maximum pressure. The compressor is an axial compressor having alternating rows of stator vanes and rotor blades arranged in a plurality of stages for sequentially compressing the air, with each succeeding downstream stage increasing the pressure higher and higher until the air is discharged from the compressor outlet at maximum pressure, hereinafter the compressor discharge pressure Pcd. A conventional combustor 16 receives the compressed outlet air from the compressor outlet 14. Conventional fuel supply conduits and injectors (not shown) are further provided for mixing a suitable fuel with the compressed outlet air for undergoing combustion in the combustor, to generate hot combustion gases. Disposed downstream from the combustor 16, in flow communication therewith, is a turbine section 18 where the energy of the hot gases is converted into work. This conversion takes place in two steps. The hot gases are expanded and the portion of the thermal energy is converted into kinetic energy in the nozzle section of the turbine. Then, in the bucket section of the turbine a portion of the kinetic energy is transferred to the rotating buckets and converted to work. A portion of the work developed by the turbine is used to drive the compressor whereas the remainder is available for generating power. The turbine thus has various components that are heated by the combustion gases, including the respective rows of stator nozzles or vanes and rotor blades that are arranged in a plurality of stages therein. As mentioned above, cooling air must be provided at suitable pressures and flow rates to cool these turbine components and to maintain an acceptable back flow margin.

Efficient operation of the gas turbine requires that a number of critical turbine operating parameters be processed to determine optimal settings for controllable parameters such as fuel flow and distribution and intake air-flow. Such operating parameters include compressor inlet and outlet temperatures and pressures, exhaust temperature and pressure and the like.

An example of a control system for a gas turbine is the General Electric Co.'s Speedtronic™ Mark V Control System, which is designed to fulfill all gas turbine control requirements, including speed and load control functions which act to control fuel flow under part-load conditions and temperature control which limits fuel flow to a maximum consistent with achieving rated firing temperatures, and controls air-flow via the inlet guide vanes. The Mark V control system also handles sequencing of the auxiliaries to allow fully automated start-up, shut-down and cool-down. Incorporated in the basic system are turbine protection against adverse operating conditions and annunciation of abnormal conditions.

Thus, the control system performs many functions including fuel, air and emissions control, sequencing of turbine fuel and auxiliary for start-up, shut-down and cool-down, synchronization and voltage matching of generator and system, monitoring of all turbine, control and auxiliary functions, and protection against unsafe and adverse operating conditions. All of these functions are performed in an integrated manner to perform the desired preprogrammed and/or operator input control philosophy. An exemplary control system of the type summarized above is described in greater detail in U.S. Pat. No. 5,857,321, the disclosure of which is incorporated herein by this reference.

As mentioned above, the invention is embodied in a cooling and purge air supply system wherein the pressures in the outer side wall cavities are controlled/modulated by the control system, so that desired cooling is provided and back flow margin is maintained while minimizing excessive leakage. In the presently preferred embodiment, the outer side wall cavity pressures are controlled to be a prescribed percentage of compressor discharge pressure (Pcd).

Thus, referring to FIG. 1, the present invention provides cooling air path(s) for conducting compressed air bled from or extracted from the compressor (interstage extraction) to selected component(s) of the turbine. For ease of illustration, the cooling circuits shown are substantially limited to those for cooling the third and fourth stage outer side wall and maintaining the pressure thereof sufficiently high to prevent back flow of hot combustion gases into those outer side wall cavities.

More specifically, the illustrated cooling circuits include extraction conduits or lines 20, 22, 24, 26 disposed in flow communication with an extraction point or stage of the compressor 10 for bleeding a portion of the compressed air as cooling or bleed air at a corresponding extraction pressure. Compressed air bleed lines can extend to any one of the heated components in the turbine requiring cooling and/or purge air. In the illustrated embodiment, the compressor air extraction conduits 20, 22, 24, 26 are connected to a bleed air extraction manifold that surrounds e.g., the twelfth or thirteen stage of the compressor section and directs the cooling air to the third and fourth stages of the turbine section 18. Line 28 conducts the compressor bleed air from conduits 20 and 22 to branch conduits 32. Branch conduit 32 flows air, via a flow restrictor, an orifice plate 38 in this example, to the third and fourth stage outer wall cavities, to provide a minimum requirement of cooling and purge air, as discussed in greater detail below.

Line 40 conducts the compressor bleed air from conduits 24 and 26 to branch conduit 42 for flowing air, via a variable orifice valve 44 to modulate the pressure of the air fed to the target outer side wall cavity(ies) in accordance with an operating condition of the gas turbine, such as a detected compressor discharge pressure. The variable orifice valve 44 is preferably designed to define a minimum orifice or operated to define a minimum orifice for Full Speed Full Load (FSFL) operation and designed to define or operated to define a maximum flow orifice or full open for CDTD operation. For compressor discharge pressure below CDTD, the mechanism is preferably adapted to remain open and for Pcd above FSFL, the mechanism is preferably adapted remain at minimum open. The variable orifice valve is otherwise suitably controlled for determining the valve opening in accordance with operating conditions, as discussed in greater detail below.

The compressor bleed air is conducted through branch conduit 42 from the variable orifice valve 44 to the outer side wall at 46 where the supplied cooling and purge air is fed internally for cooling the outer side wall. The air supplied to the outer side wall cavity is vented into the gas path via openings (not shown), e.g. in the trailing edge of the third stage nozzle 36.

In the system and method provided according an exemplary embodiment of the invention, cavity pressure Posw and potentially temperature are sensed with suitable disposed sensors schematically shown at 50 as is the compressor discharge pressure Pcd, e.g. with a suitable sensor 48, and the valve orifice 44 is controlled to determine the outer wall cavity pressure. More specifically, the pressure of the stage three nozzle outer side wall cavity and the pressure of the stage four nozzle outer side wall cavity are measured/monitored and compressed air flow thereto via the variable orifice valve 44 is controlled to maintain the pressures of these cavities within prescribed limits, for example, to a prescribed percentage of the compressor discharge pressure. Thus, in the presently preferred embodiment, as described in greater detail below, the pressure in the outer side wall cavity of the third stage nozzle is set to about 28.2% of compressor discharge pressure Pcd over the relevant operation range (Turn Down [TD] to Full Load, and from Cold Day to Hot Day). The pressure, and temperature, of the third stage nozzle outer side wall cavity is preferably measured using triple redundancy with the sensors ideally being located in the lower half of the outer casing. Also according to the presently preferred embodiment, as described in greater detail below, the pressure in the outer side wall cavity of the fourth stage nozzle is set to about 9.8% of compressor discharge pressure Pcd over the relevant operation range (TD to Full Load, and from Cold Day to Hot Day). The pressure of the fourth stage outer sidewall cavity is preferably measured using double redundancy and, again, the location of the sensors is ideally in the lower half of the outer casing.

The system is also advantageously designed so as that in the event of component failure, that failure will not lead to catastrophic turbine failure. As parts life and operation is dependent upon component cooling and preventing back flow of hot combustion gases, the flow control mechanism 44 provided as an embodiment of the invention advantageously fails open and/or a parallel flow path is provided to supply cooling and purge air flow in the event of valve 44 failure. Thus, in the illustrated embodiment, branch conduit 32 is provided as a second flow path for compressor bleed air. As described above, branch conduit 32 includes a flow restrictor, specifically an orifice plate 38, for defining a minimum flow of compressor bleed air to the turbine 18 in the event of variable orifice 44 failure. Although in the presently preferred embodiment, an orifice plate is provided, it is to be understood that another similar such component may be provided to enable the appropriate fail-safe conditions.

As the gas turbine operates off design, away from full speed full load (FSFL) the work distribution in the compressor will change and so will the relationship between the interstage pressures. Accordingly, a spreadsheet was set up to find an appropriate rule for controlling outer sidewall cavity pressure. More particularly, four steady state cycle points were examined, namely Cold Day Turn Down (CDTD); ISO Turn Down (ISO-TD), Full Speed Full Load (FSFL) and Cold Day (CD). In this example, the cooling/purge air was extracted from the twelfth ($12^{th}$) stage of the compressor. It is to be understood, however, that this invention is not to be limited to a particular extraction source. The data is summarized in TABLE 1.

TABLE 1

Third and Fourth Stage Outer Side Wall Cavities

| Case | CDTD | FSFL | Cold Day | ISO turn down |
|---|---|---|---|---|
| P12 | 80.5 | 147.5 | 154.63 | 102.56 |
| Pcd | 224.07 | 338.11 | 382.93 | 252.77 |
| P3-nozzlemax-estimate | 59.583 | 89.2 | 101.2213 | 66.99 |
| P4-nozzlemax-estimate | 21.1765 | 29.7 | 34.2212 | 23.2624 |
| P12/Pcd | 0.3593 | 0.4362 | 0.4038 | 0.4057 |
| [P12/Pcd]/[P12/Pcd]fsfl | 0.8235 | 1 | 0.9256 | 0.9301 |
| P3osw/Pcd-limits | 0.282 | 0.282 | | |
| P4osw/Pcd-limits | 0.098 | 0.098 | | |
| P3osw/Pcd-desired | 0.282 | 0.282 | 0.282 | 0.282 |
| P4osw/Pcd-desired | 0.098 | 0.098 | 0.098 | 0.098 |
| P3osw-desired | 63.1877 | 95.347 | 107.9863 | 71.2811 |
| P4osw-desired | 21.9589 | 33.1348 | 37.5271 | 24.7715 |
| P3osw/P12-desired | 0.7849 | 0.6464 | 0.6984 | 0.695 |
| P4osw/P12-desired | 0.2728 | 0.2246 | 0.2427 | 0.2415 |
| BFM 3-desired | 6.0499 | 6.8913 | 6.6833 | 6.4056 |
| BFM 4-desired | 3.6946 | 11.5649 | 9.6606 | 6.4873 |

As will be appreciated, the relation [P12/Pcd]/[P/12/Pcd] fsfl shows the degradation in Stage 12 pressure for off design conditions.

Figure 2:
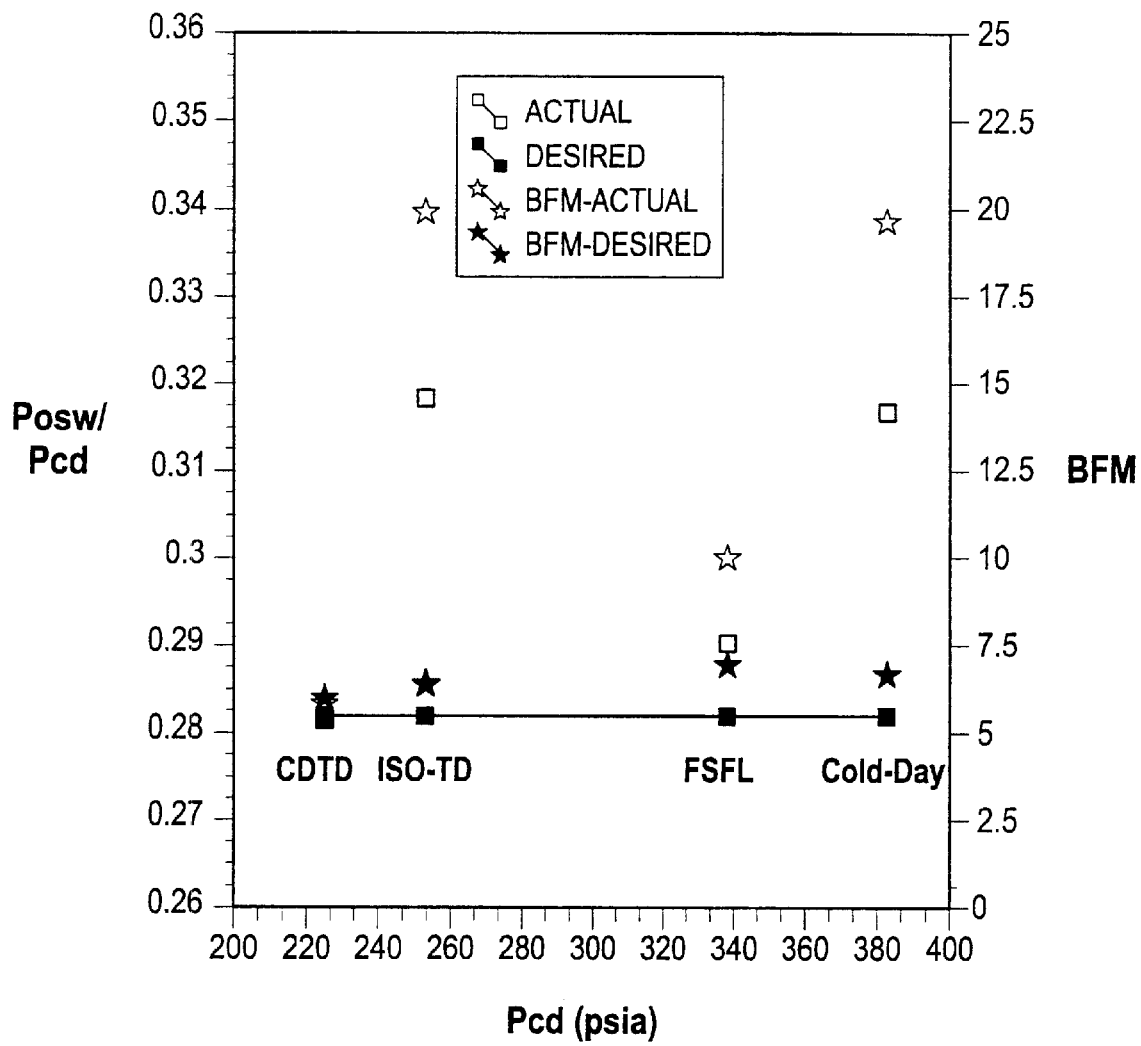
FIG. 2 is a plot of Posw/Pcd versus Pcd and BFM versus Pcd for the stage three outer side wall cavity.
Figure 3:
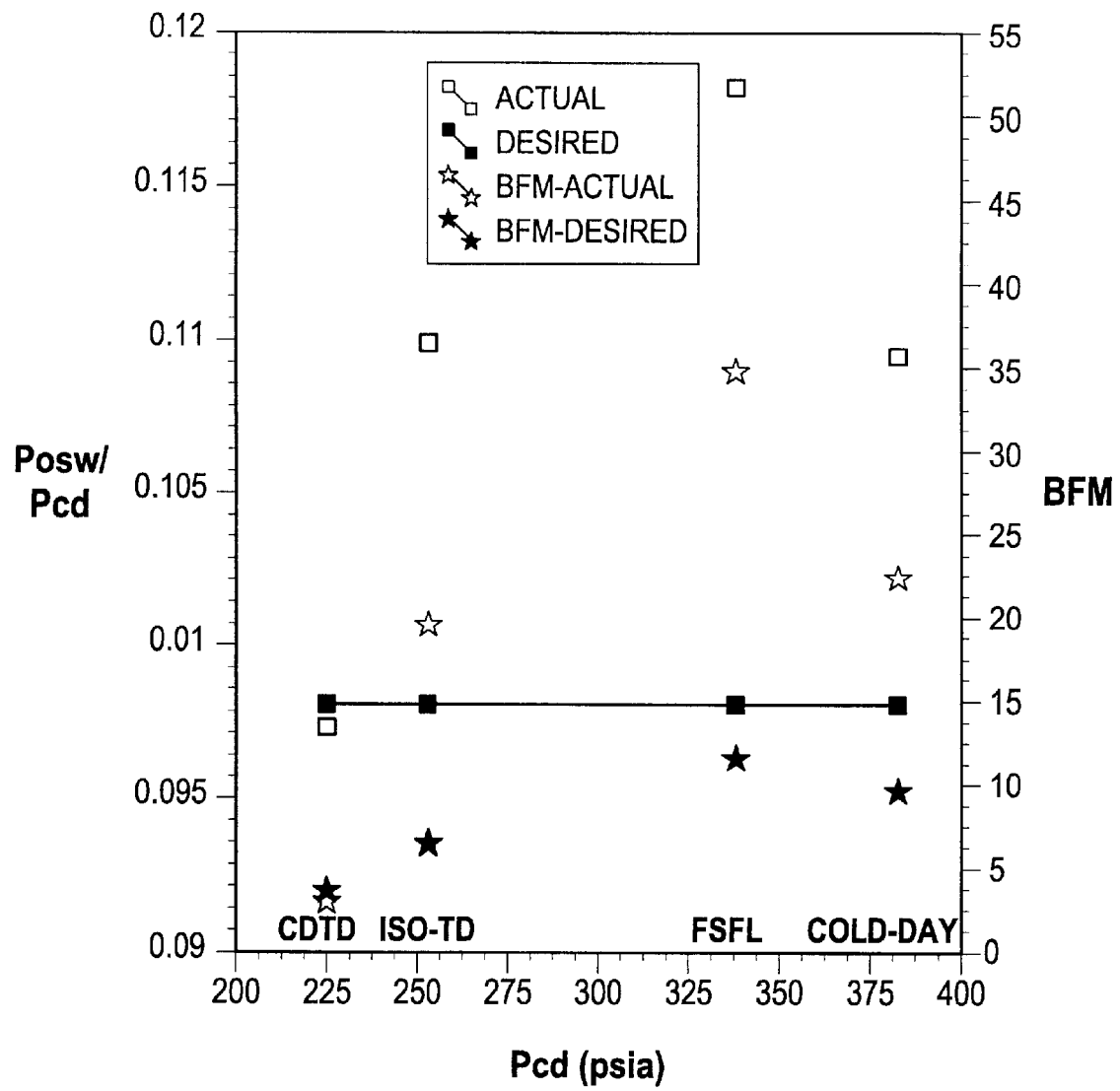
FIG. 3 is a plot of Posw/Pcd versus Pcd and BFM versus Pcd for the stage four outer side wall cavity.

Referring to FIGS. 2 and 3, actual and desired values for the outer sidewall pressure (Posw/Pcd) are plotted versus Pcd and actual and desired values for the back flow margin BFM are plotted versus Pcd. The actual values depicted in FIGS. 2 and 3 demonstrate that the cavity pressure and thus the back flow margin increase away from the threshold established for the worst conditions. This means that the cavity pressure, and thus the back flow margin is greater than necessary to preclude back flow and results in excessive leakage. It would thus be desirable first for the flow of cooling air bled from the compressor to be sufficient for the part to be sufficiently cooled to optimize component life without having been excessively cooled (which wastes the work invested in the cooling air) and, second, for the pressure of the air to be sufficient for back flow to be precluded.

The invention is thus embodied in a gas turbine system wherein the pressure in the outer side wall cavities is modulated to maintain the outer side wall cavity pressure at a level sufficient to satisfy the requirement for a minimum BFM under the worst conditions and to ensure sufficient pressure and cooling flow, while minimizing excessive leakage and cooling. In an exemplary embodiment, pressure in the outer side wall cavities is modulated to be maintained at substantially a constant percentage of the compressor discharge pressure. In the presently preferred embodiment, that prescribed percentage corresponds to a ratio of the component air pressure, in this case the outer side wall cavity, to compressor discharge pressure required at Cold Day Turn Down (CDTD) to provide the prescribed minimum back flow margin.

Thus, in an exemplary embodiment, the gas turbine and air flow passages are adapted to set the pressure of the third ($3^{rd}$) stage outer side wall cavity to a predetermined ratio of approximately 28.2% of the compressor discharge pressure. The turbine control system is thus adapted to detect the pressure present in the third stage outer side wall cavity and the compressor discharge pressure, and to address compressor bleed to generally maintain the predetermined ratio of third stage outer side wall cavity pressure to compressor discharge pressure. The maximal back flow margin is correspondingly maintained near the minimum defined by the CDTD so as to minimize waste due to excessive leakage. Thus, referring to TABLE 1, it can be seen that in the case of Cold Day Turn Down, with a prescribed and controlled ratio of third stage outer side wall pressure to compressor discharge pressure, where the compressor discharge pressure is 224.07 and the pressure of compressor stage twelve air is 80.5, the third stage outer side wall pressure would be controlled, in this example, to approximately 63.19, i.e. 28.2% of the compressor discharge pressure. Meanwhile, the estimated maximum third stage nozzle pressure under these conditions is 59.58, such that the back flow margin, the percentage cavity pressure is above the maximum pressure in the gas path, would be approximately 6.05%.

In the case of Full Speed Full Load, it is seen that the pressure of the compressor stage twelve air is increased to 147.5 and the compressor discharge pressure is increased to 338.11. With the pressure of the third stage outer side wall controlled to about 28.2% of the compressor discharge pressure, in this exemplary embodiment, the third stage outer side wall cavity pressure would be maintained at about 95.35. Since under these conditions the maximum nozzle pressure is estimated to be 89.2, it is seen that the back flow margin would be maintained to approximately 6.89%. Similarly in the case of Cold Day conditions and ISO turndown, controlling the pressure of the third stage outer side wall cavity to a prescribed percentage of the compressor discharge pressure, about 28.2% in this example, the back flow margin will be controlled to be maintained generally near the threshold established for the worst conditions (CDTD), thereby to minimize excessive leakage.

In a presently preferred embodiment of the invention, the target fourth ($4^{th}$) stage outer side wall cavity pressure is also modulated to maintain the fourth stage outer side wall cavity pressure to satisfy the requirement for a minimum BFM under the worst conditions, to ensure sufficient pressure and cooling flow, while minimizing excessive leakage and cooling. In an exemplary embodiment, as noted above, pressure in the outer side wall cavities is modulated to be maintained at substantially a constant percentage of the compressor discharge pressure, and in the presently preferred embodiment, that prescribed percentage corresponds to a ratio of the component air pressure, in this case the outer side wall cavity, to compressor discharge pressure required at Cold Day Turn Down (CDTD) to provide the prescribed minimum back flow margin.

Thus, in an exemplary embodiment, the gas turbine and air flow passages are adapted to set the pressure of the fourth ($4^{th}$) stage outer side wall cavity to a predetermined ratio of approximately 9.8% of the compressor discharge pressure.

By maintaining the ratio of the fourth stage outer side wall cavity pressure to the compressor discharge pressure at a prescribed value, in the presently preferred embodiment generally corresponding to the ratio required at CDTD to provide the prescribed minimum back flow margin, throughout turbine operation, a back flow margin is provided that is sufficient to purge, but avoiding the excessive leakage seen with the conventional system, illustrated by the actual values in FIG. 3.

The turbine control system is thus also adapted to detect the pressure present in the fourth stage outer side wall cavity, and to adjust compressor bleed to maintain the predetermined ratio of fourth stage outer side wall cavity pressure to compressor discharge pressure. The maximal back flow margin is correspondingly maintained generally near the minimum defined by CDTD so as to minimize waste due to excessive leakage. Thus, referring to TABLE 1, it can be seen that in the case of Cold Day Turn Down, with a prescribed and controlled ratio of fourth stage outer side wall pressure to compressor discharge pressure, where the compressor discharge pressure is 224.07 and the pressure of compressor stage twelve air is 80.5, the fourth stage outer side wall pressure will be controlled, in this example, to approximately 21.9589, i.e. 9.8% of the compressor discharge pressure. Meanwhile, the estimated maximum fourth stage nozzle pressure under these conditions is 21.1765, such that the back flow margin, the percentage cavity pressure is above the maximum pressure in the gas path, will be approximately 3.69%.

In the case of Full Speed Full Load, it is seen that the pressure of the compressor stage twelve air is increased to 147.5 and the compressor discharge pressure is increased to 338.11. With the pressure of the fourth stage outer side wall controlled to 9.8% of the compressor discharge pressure, in this exemplary embodiment, the fourth stage outer side wall cavity pressure will be maintained at about 33.1. Since under these conditions the maximum fourth stage nozzle pressure is estimated to be 29.7, it is seen that the back flow margin will be approximately 11.6%. While this is some three times the BFM for CDTD conditions, it is still only about one third of the margin seen in the conventional system, illustrated by the actual value plot in FIG. 3. Similarly in the case of Cold Day conditions and ISO turndown, controlling the pressure of the fourth stage outer side wall cavity to a prescribed percentage of the compressor discharge pressure, about 9.8% in this example, the back flow margin is controlled to be maintained substantially closer to the threshold established for the worst conditions (CDTD) than the conventional system, thereby to minimize excessive leakage.

To control P3osw and P4osw according to an operating condition of the turbine, for example to respective prescribed percentages of the Pcd, two control valves 44 can be provided, one for the third stage outer side wall and one for the fourth stage outer side wall. However, in the illustrated embodiment, only a single air supply 42 and control valve 44 is shown for controlling flow to the third stage outer side wall. To control the flow to/pressure in the fourth stage outer side wall in this embodiment, then, there are holes (not shown) from the third stage to the fourth stage which are suitably determined to insure that the fourth stage outer side wall has the correct amount of purge flow per its pressure (9.8% of Pcd in the presently preferred embodiment).

As is evident from the foregoing, to facilitate implementation of a prescribed pressure modulation, a relationship between outer side wall pressure and compressor discharge pressure has been selected corresponding to that required at Cold Day Turn Down (CDTD) to provide the prescribed minimum back flow margin and is applied during at least a portion of a range of turbine operations, e.g. TD to Full Load, and from Cold Day to Hot Day. It is to be understood, however, that the pressure modulation is not limited to the disclosed example, so long as sufficient cooling flow can be realized and sufficient back flow margin for continuous purging is provided.

In that regard, the back flow margin is conventionally set, as noted above, according to the worst conditions and further is set to allow a sufficient buffer to accommodate machine to machine variations. Furthermore, different manufactures will determine appropriate pressures and margins for optimizing net efficiency and net output. Thus, for example, the desired ratio of outer side wall pressure to compressor discharge pressure, and consequently back flow margin, may be not only machine dependent but also manufacturer dependent.

Accordingly, while the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

What is claimed is:

1. A method for providing cooling and/or purge air from a multi-stage compressor to an associated turbine for cooling at least one target component of said turbine and/or preventing back flow of combustion gases thereinto comprising:

selectively extracting bleed air from a stage of the compressor that is upstream of a discharge of the compressor, flowing at least a portion of said extraction through a first flow path from said compressor towards a first target component of said turbine; and controlling flow along said flow path to selectively control an air pressure at said first target component of said turbine according to an operating condition of at least one of said compressor and said turbine.

2. A method as in claim 1, comprising controlling said air pressure, during at least a portion of an operating range of said turbine, according to a discharge pressure of said compressor section.

3. A method as in claim 2, wherein said flowing step comprises flowing said cooling and/or purge air to an interior of said first target component, and wherein said controlling step comprises controlling said air pressure to substantially maintain the air pressure within said component at a value that is a prescribed percentage of a discharge pressure of said compressor.

4. A method as in claim 3, wherein said prescribed percentage corresponds to a ratio of the component air pressure to compressor discharge pressure at Cold Day Turn Down (CDTD) required to provide a prescribed difference between the component air pressure and a pressure of combustion gases flowing through the turbine.

5. A method as in claim 1, further comprising flowing bleed air along a second flow path from said compressor towards said first target component of said turbine, at least a portion of said second flow path being disposed in parallel to said first flow path.

6. A method as in claim 5, further comprising controlling flow along said second flow path to control a pressure of air delivered therethrough to said first target component.

7. A method for providing cooling and/or purge air from a multi-stage compressor to an associated turbine for cooling at least one target component of said turbine and/or preventing back flow of combustion gases thereinto comprising:

selectively extracting bleed air from a stage of the compressor, flowing at least a portion of said extraction through a first flow path from said compressor towards a first target component of said turbine;

controlling flow along said flow path to selectively control an air pressure at said first target component of said turbine according to an operating condition of at least one of said compressor and said turbine, and controlling said air pressure, during at least a portion of an operating range of said turbine, according to a discharge pressure of said compressor section, wherein said flowing step comprises flowing said cooling and/or purge air to an interior of said first target component, and wherein said controlling step comprises controlling said air pressure to substantially maintain the air pressure within said component at a value that is a prescribed percentage of a discharge pressure of said compressor.

8. A method as in claim 7, wherein said prescribed percentage corresponds to a ratio of the component air pressure to compressor discharge pressure at Cold Day Turn Down (CDTD) required to provide a prescribed difference between the component air pressure and a pressure of combustion gases flowing through the turbine.

* * * * *